Patented June 20, 1950

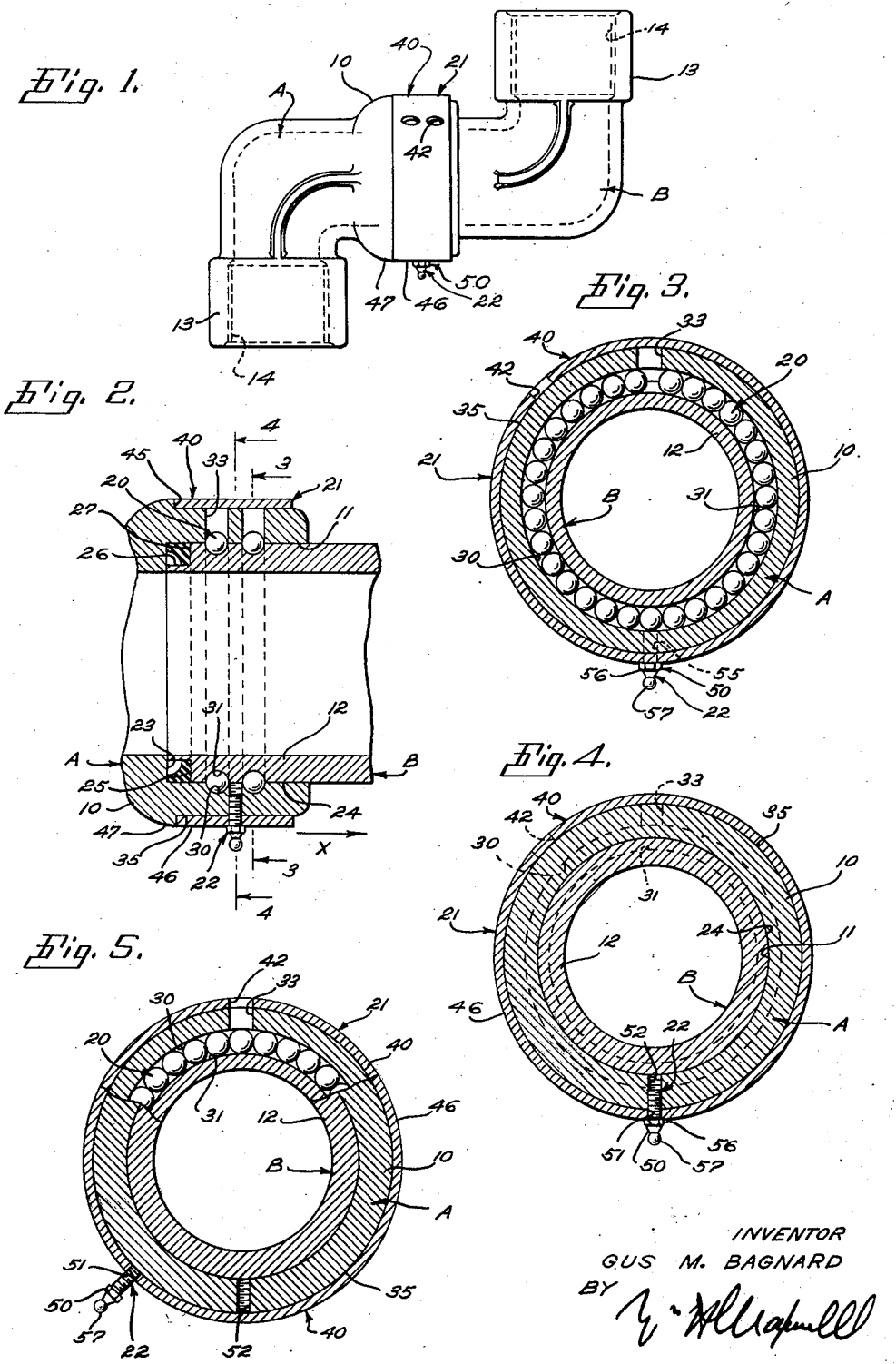

2,512,006

UNITED STATES PATENT OFFICE 2,512,006

BALL TYPE SWIVEL CONNECTION

Gus M. Bagnard, Anaheim, Calif., assignor to Chicksan Company, Brea, Calif., a corporation of California Application February 18, 1948, Serial No. 9,098

4 Claims. (Cl. 285—97.3)

This invention is concerned with a ball type swivel connection and it is a general object to provide a simple, practical and improved connection or joint between two parts such as two fluid conductors, in which joint or connection balls are employed to couple the parts and to provide anti-friction bearing means between the parts.

It is common to provide swivel joints or connections between parts such as tubular fluid conductors with one or more rows of balls that couple the conductors and afford anti-friction means between the conductors. It is also common to introduce the balls through one or more openings in the outermost or socket member and to provide plugs and various accessories to retain the balls in place. Such constructions are more or less complicated and cumbersome, are usually costly of manufacture, and involve projecting parts highly undesirable in many situations.

A general object of the present invention is to provide a joint construction involving one or more rows of balls forming bearings retaining the pin section of the joint in the socket section and involving a single simple sleeve on one section shiftable relative to said section between a position where it effectively and dependably retains the balls in place and a position where the balls can be freely passed into and out of operating position.

Another object of the invention is to provide a construction of the general character referred to in which a single simple member serves as a retainer for the sleeve and as a fitting by which a lubricant can be introduced to the working parts.

It is another object of the invention to provide a structure of the general character referred to involving few simple parts, that are inexpensive of manufacture and simple and convenient to operate.

Another object of the invention is to provide a structure of the character referred to free of bulky projecting parts, with the result that the structure is smooth and compact.

A further object of the present invention is to provide a structure of the character referred to in which the member that retains the sleeve and passes the lubricant also serves as a handle by which the sleeve can be operated when the member is released, allowing the sleeve to be operated.

The various objects and features of my invention will be fully understood from the following detailed description of a typical preferred form and application of the invention, throughout which description reference is made to the accompanying drawings, in which:

Fig. 1 is a side elevation of a swing joint or swivel connection involving the structure provided by the present invention. Fig. 2 is an enlarged detailed sectional view at the joint between the connected parts. Fig. 3 is a transverse sectional view taken as indicated by line 3—3 on Fig. 2. Fig. 4 is an enlarged transverse sectional view taken as indicated by line 4—4 on Fig. 2, and Fig. 5 is a transverse sectional view illustrating the retaining sleeve positioned to allow the balls to be pressed in or removed from the joint, the upper portion of the figure being taken at the plane of Fig. 3 and the lower portion of the figure being taken at the plane of Fig. 4.

The construction provided by the present invention is applicable, generally, to swivel joints or connections and can be used to great advantage in connection with joints connecting fluid conductors. In the form of the invention illustrated there are two tubular members A and B connected for relative rotation, the members A and B being alike, except that the member A is provided at its inner end with an enlarged part 10 formed with a socket opening 11 and is therefore a female member, while the member B is provided at its inner end with a spindle part 12 that enters and is rotatable in the socket opening 11, and is therefore a male member.

The members A and B may vary widely in type or form, the particular members illustrated being L-shaped in which case they have outer end portions 13 that are at right angles to the inner end portions. The outer end parts 13 of the members A and B are internally threaded at 14 to receive pipes, or the like.

The construction of the present invention includes in addition to the elements A and B, balls 20 that act between the members to provide bearing means between the members and to hold the members against separation or axial shifting. The construction further involves a retainer 21 for the balls and lock means 22 for the retainer.

In the form of the invention illustrated the socket opening 11 entering the enlarged part or socket portion 10 of member A enters the part 10 from the inner end of the member A and is preferably a simple, straight bore terminating in a flat bottom or shoulder 23. The inner end portion or spindle part 12 of member B is a simple straight part with a smooth turned exterior 24 rotatably fitted in the bore or opening 11. In the particular case illustrated sealing means in the form of a packing ring 25 is provided to seal between the members A and B and in the case illustrated the inner end portion of the spindle part 12 is reduced in diameter at 26, accommodating the packing ring 25 so that it acts between the bottom 23 of the socket opening and an opposing shoulder 27 at the inner end portion of the spindle 12.

The balls 22 provided as being means and to couple the members A and B together are arranged in one or more series or annular rows. In the case illustrated I show two rows of balls 20. Grooves 30 are formed in the wall of the bore 11 to register with grooves 31 in the exterior of the spindle part 11, and thus form channels that carry or accommodate the balls 20.

In accordance with my present invention ball passages 33 extend from the ball carrying channels radially outward at the exterior of the socket part 10 of member A. In the particular construction shown the part 10 is turned down or reduced somewhat in diameter at 35, where it carries the retainer 21 and the ball passages 33 open at the reduced part 35, as clearly shown in Fig. 2 of the drawings. It is preferred that there be a ball passage 33 for each ball carrying channel and that the ball passages be only large enough in diameter to pass the balls into and out of the channels.

The retainer 21 serves to close the ball passages 33 and thus retains the balls in operating position in the structure. In accordance with the preferred form of the invention the retainer 21 is a simple thin-walled tubular element or sleeve 40 slidably or shiftably supported on the exterior of the part 10. When the part 10 is provided with the reduced turned portion 35 the sleeve 40 is slidably engaged on this portion of part 10. It is contemplated that the sleeve 40 should normally cover the passage or passages 33 as the case may be, and that it be shiftable between such normal position and a released position where the passage or passages are open or uncovered. It will be apparent that with the construction illustrated the sleeve 40 may be shifted axially or in the direction indicated by the arrow X in Fig. 2 to uncover either one or both of the passages 33.

In the preferred form of the invention the structure is such that the sleeve 40 may be rotated on part 10 and in this case a port or ports 42 may be provided in the sleeve 40 normally out of register with the passages 33, as shown in Figs. 2, 3 and 4, but shiftable into position where they register with the passage 33 as shown in Fig. 5. In the preferred construction, by providing the reduced part 35 on the exterior of the socket part 10 of member A a shoulder 45 is formed. The retainer ring 40 preferably engages or bears against shoulder 45 and it is preferred that the ports 42 in the ring 40 be so located as to register with the passages 33 when the ring is against the shoulder 45 and in the proper rotative position. By providing the reduced or recessed part 35 the exterior 46 of the ring 44 may be flush with the exterior 47 of the part 10 thus providing a smooth construction free of undesirable projections.

The lock means 22 is provided for setting the retainer against displacement from the position where it covers the passages 33. The means 22 preferably involves a single member 50 engaged in an opening 51 in the sleeve 40 and engageable in an opening 52 in the socket part 10 of member A.

The member 50 is an elongate part externally threaded and in the preferred construction it has threaded engagement with the opening 51 and also in opening 52. The member 50 has a central longitudinal opening or passage 55 extending through it from one end to the other so that it may serve as a grease or lubricant conductor. In the preferred form of the invention a head 56 is provided on the outer end of member 50, which head is adapted to be engaged by a suitable tool through which the member 50 can be operated or rotated when desired. In the case illustrated the head 56 is polygonal so that it can be readily engaged by an ordinary wrench. Further, when the member 50 is to serve as a lubricant conductor or grease fitting it is desired that a lubricant head 57 be provided on the outer end of the member 50, which head 57 may be such as to receive suitable lubricant handling equipment.

When the member 50 is in the operating position locking the sleeve in position where the sleeve closes the passages 33, which position is illustrated in Figs. 2, 3 and 4 of the drawings, the head 57 is exposed so that lubricating equipment can be engaged therewith so that suitable lubricant can be introduced into the structure in a manner to lubricate the balls 20. It will be apparent that when the member 50 is engaged or in, as just described, it positively sets or locks the sleeve against movement either axially or rotatably on the socket part 10.

When it is desired to release the sleeve 40 for operation in a manner to uncover the passages 33 either by rotation of the sleeve or axial shifting of the sleeve the member 50 may be released or withdrawn either entirely from part 10 and the sleeve 40 or only from part 10, leaving it engaged only with sleeve 40. It is preferred ordinarily that the member 50 be disengaged only from part 10 and it be left threaded into the opening 51 in the sleeve so that it projects a substantial distance radially from the exterior of the sleeve 40 as shown in Fig. 4, forming a convenient handle or part that can be engaged to facilitate shifting of the sleeve on the part 10.

In the preferred arrangement of parts it is desirable to locate the opening 52 in the part 10 in the corner or crotch portion of member A, established by the angularly related end portions, as clearly shown in the drawings, particularly Fig. 1, with the result that the heads 56 and 57 of member 50 are shielded or protected by the general structure or formation of member A and do not project in a manner to be injured or to form undesirable protuberances.

From the foregoing description it will be apparent that I have provided a structure that is very simple to manufacture, in that it involves but few simple parts, the parts required for controlling the admission or escape of the balls 20 being limited to the simple sleeve 40 and the lock member 50. Further, it will be apparent that the structure is simple and compact and very easy and convenient to operate. The structure is free of complicated or delicate parts and the only projecting parts which are the heads on member 50 are located in the corner of the structure where they are protected and in no way disagreeable. It is also significant that the construction can be satisfactorily operated to allow removal or insertion of the balls 20 without detaching any parts. As above outlined the member 50 can be released from the opening 52 without being separated from the sleeve 40, in which case no part of the structure is freed or released to be lost or misplaced.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A joint of the character described including, two members, one having a female part with a socket and the other having a projection entering the socket, the said part and projection having registering annular grooves forming an annular channel, balls in the channel positively coupling the two members for relative rotation, one member having an open ball passage communicating with the channel and through which the balls pass to and from the channel, a rigid continuous annular retainer shiftably carried by said member and shiftable into and out of position closing the outer end of said passage, and a releasable member normally holding the retainer in position closing said passage.

2. A joint of the character described including, a female part with a socket, a male part with a projection entering the socket, there being registering grooves in the wall of the socket and in the exterior of the projection forming an annular channel, balls in the channel positively coupling the two members for relative rotation, there being a radial unoccupied opening in the female part communicating with the channel and through which the balls pass to and from the channel, there being a second opening in the female part and communicating with the socket to pass lubricant to the balls, a rigid continuous annular retainer shiftably carried on the female part and shiftable into and out of position closing the outer end of the passage, and a lubricant passing member engaged in said second opening and with the retainer to hold the retainer in position closing the passage.

3. A joint of the character described including, a female part with a socket, a male part with a projection entering the socket, there being registering grooves in the wall of the socket and in the exterior of the projection forming an annular channel, balls in the channel positively coupling the two members for relative rotation, there being a radial unoccupied opening in the female part communicating with the channel and through which the balls pass to and from the channel, there being a second opening in the female part and communicating with the socket to pass lubricant to the balls, a rigid continuous annular retainer shiftably carried on the female part and shiftable into and out of position closing the outer end of the passage, there being an opening in the retainer registering with the said second opening when the retainer is in position closing the passage, and a lubricant passing member threaded through the said opening in the retainer and into the said second opening to releasably hold the retainer in position closing the passage.

4. A joint of the character described including, an L-shaped tubular female section with a socket at one end and a pipe receiving part at the other end, the socket and said part forming a substantially right angled corner, a male section with a projection entering the socket, there being registering grooves in the socket and projection forming an annular channel, balls in the channel positively coupling the sections for relative rotation, there being a ball passage in the female section through which balls pass to and from the channel, an annular rigid retainer shiftably carried on the socket of the female section and shiftable into and out of position closing the outer end of the passage, and a releasable holder engaging the female section and the retainer and projecting from the exterior of the retainer at the inside of said corner, the said holder passing lubricant to the balls and releasably holding the retainer in position closing the said passage.

GUS M. BAGNARD.

REFERENCES CITED

The following references are of record in the file of this patent:

UNITED STATES PATENTS

| Number | Name | Date |
| --- | --- | --- |
| 2,269,431 | Allen | Jan. 13, 1942 |
| 2,448,395 | Schaetzly | Aug. 31, 1948 |
| 2,448,688 | Scheiwer | Sept. 7, 1948 |
| 2,452,430 | Clark | Oct. 26, 1948 |